US012639644B2

(12) United States Patent
White

(10) Patent No.: US 12,639,644 B2
(45) Date of Patent: May 26, 2026

(54) AUTO-MANAGING REQUESTOR COMMUNICATIONS TO ACCOMMODATE PENDING ACTIVITIES OF DIVERSE ACTORS

(71) Applicant: Microsoft Technology Licensing, LLC, Redmond, WA (US)

(72) Inventor: Ryen W. White, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 267 days.

(21) Appl. No.: 17/710,626

(22) Filed: Mar. 31, 2022

(65) Prior Publication Data

US 2023/0316180 A1 Oct. 5, 2023

(51) Int. Cl.
G06Q 10/0631 (2023.01)

(52) U.S. Cl.
CPC ............................ G06Q 10/063114 (2013.01)

(58) Field of Classification Search
CPC .................. G06Q 10/06311; G06Q 10/063114
See application file for complete search history.

(56) References Cited

U.S. PATENT DOCUMENTS

| | | |
|---|---|---|
| 6,854,007 B1 | 2/2005 | Hammond |
| 2004/0019603 A1 | 1/2004 | Haigh et al. |
| 2005/0058268 A1 | 3/2005 | Koch |
| 2006/0106854 A1 | 5/2006 | Haigh et al. |
| 2007/0083465 A1 | 4/2007 | Ciurea et al. |

| | | | |
|---|---|---|---|
| 2010/0159978 A1 | 6/2010 | Sierawski | |
| 2015/0161555 A1* | 6/2015 | Cui ................ | G06Q 10/063118 |
| | | | 705/7.17 |
| 2016/0292011 A1* | 10/2016 | Colson ................... | G06F 9/5027 |
| 2016/0300178 A1 | 10/2016 | Perry et al. | |
| 2017/0237694 A1 | 8/2017 | Choudhary et al. | |
| 2017/0323233 A1* | 11/2017 | Bencke .............. | G06Q 10/0633 |
| 2018/0129995 A1* | 5/2018 | Fowler .................. | G06F 3/0482 |
| 2019/0228766 A1 | 7/2019 | White et al. | |
| 2021/0303369 A1* | 9/2021 | Hamze ..................... | G06F 8/35 |
| 2022/0318698 A1* | 10/2022 | Matsuoka .......... | G06Q 10/0633 |
| 2023/0022198 A1* | 1/2023 | Matsuoka ........ | G06Q 10/06311 |
| 2023/0063334 A1* | 3/2023 | Matsuoka ...... | G06Q 10/063114 |

(Continued)

OTHER PUBLICATIONS

Zhou, Zhifeng, et al. "Dynamic pricing in profit-driven task assignment: a domain-of-influence based approach." International Journal of Machine Learning and Cybernetics 12.4 (2021): 1015-1030. (Year: 2021).*

(Continued)

*Primary Examiner* — Andre D Boyce
(74) *Attorney, Agent, or Firm* — Alleman Hall LLP

(57) ABSTRACT

Aspects of the present disclosure relate to assisting a requestor to manage activities a cross a plurality of diverse actors. In examples, a system is provided that includes at least one processor, and memory storing instructions that, when executed by the at least one processor, causes the system to perform a set of operations. The set of operations include receiving a request for a task to be completed, from the requestor, receiving actor context data, recording an assignment of the task to an actor, based on the actor context data, generating a communication to request that the actor complete the assigned task, and sending the communication to the actor.

10 Claims, 11 Drawing Sheets

(56)          References Cited

U.S. PATENT DOCUMENTS

2023/0064816 A1*   3/2023   Matsuoka ............. G06Q 50/01
2023/0206181 A1*   6/2023   Stone .................. G06Q 10/103
                                                                         705/7.14

OTHER PUBLICATIONS

Hassan, Umair Ul, and Edward Curry. "A multi-armed bandit approach to online spatial task assignment." 2014 IEEE 11th Intl Conf on Ubiquitous Intelligence and Computing and 2014 IEEE 11th Intl Conf on Autonomic and Trusted Computing, pp. 212-219 (Year: 2014).*

Song, Shiwei, et al. "Coverage-oriented task assignment for mobile crowdsensing." IEEE Internet of Things journal 7.8 (2020): 7407-7418. (Year: 2020).*

"Automatic Follow-up Emails", Retrieved from: https://web.archive. org/web/20200701224322/https://www.saleshandy.com/automatic-follow-up-emails/, Jul. 1, 2020, 12 Pages.

Goel, Ajay, "Setup Gmail Auto Follow-Up Emails Until You Get a Reply", Retrieved from: https://www.gmass.co/blog/auto-follow-up-emails-until-reply/, Apr. 18, 2021, 33 Pages.

"International Search Report and Written Opinion Issued in PCT Application No. PCT/US23/012968", Mailed Date: May 10, 2023, 14 Pages.

\* cited by examiner

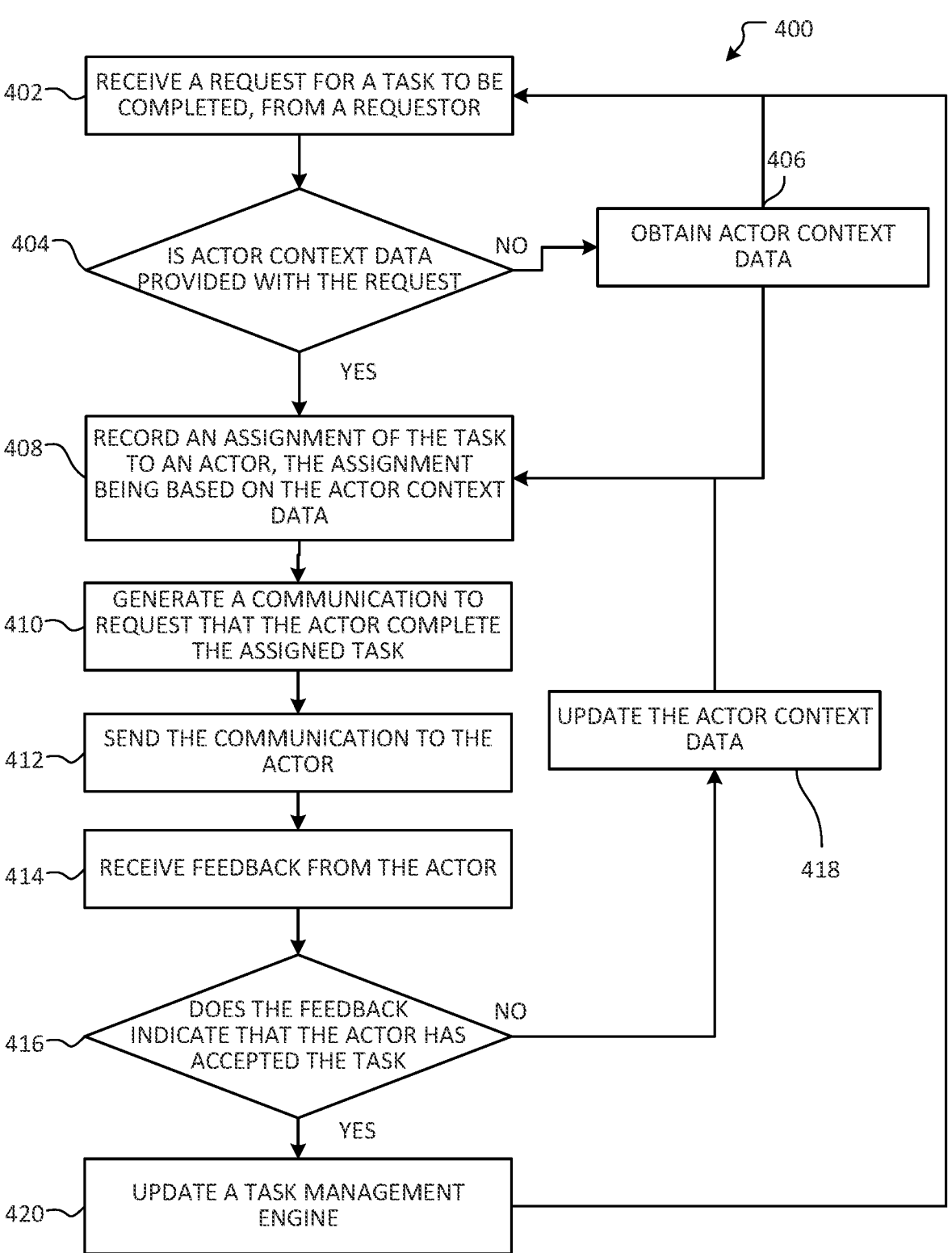

400

402 — RECEIVE A REQUEST FOR A TASK TO BE COMPLETED, FROM A REQUESTOR

404 — IS ACTOR CONTEXT DATA PROVIDED WITH THE REQUEST

NO

406 — OBTAIN ACTOR CONTEXT DATA

YES

408 — RECORD AN ASSIGNMENT OF THE TASK TO AN ACTOR, THE ASSIGNMENT BEING BASED ON THE ACTOR CONTEXT DATA

410 — GENERATE A COMMUNICATION TO REQUEST THAT THE ACTOR COMPLETE THE ASSIGNED TASK

412 — SEND THE COMMUNICATION TO THE ACTOR

414 — RECEIVE FEEDBACK FROM THE ACTOR

UPDATE THE ACTOR CONTEXT DATA

418

416 — DOES THE FEEDBACK INDICATE THAT THE ACTOR HAS ACCEPTED THE TASK

NO

YES

420 — UPDATE A TASK MANAGEMENT ENGINE

AUTO-MANAGING REQUESTOR COMMUNICATIONS TO ACCOMMODATE PENDING ACTIVITIES OF DIVERSE ACTORS

BACKGROUND

When delegating or assigning activities, there are typically two roles: an actor (e.g., one who performs the activity) and a requestor (e.g., one who assigns the activity and follows up with the actor regarding the activity, if the activity is incomplete). Activities can include any kind of tasks such as, for example, responding to an email, reviewing papers for an academic conference, RSVP'ing to a birthday party, etc.

Often, diverse actors with different communication styles may not complete their activities on time, thereby requiring requestors to spend a lot of time following up on activities. For requestors, keeping track of and sending follow-up correspondence for activities can be challenging, time-consuming, cognitively demanding, and de-motivating.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for assisting a requestor to manage activities across diverse actors to accommodate the actor's needs and preferences.

In some aspects of the present disclosure, a system is provided. The system includes at least one process, and memory storing instructions that, when executed by the at least one processor, causes the system to perform a set of operations. The set of operations include receiving a request for a task to be completed, from the requestor. The set of operations further include receiving actor context data, and recording an assignment of the task to an actor. The assignment is based on the actor context data. The set of operations further include generating a communication to request that the actor complete the assigned task, and sending the communication to the actor.

In some aspects of the present disclosure, a method for assisting a requestor to manage activities across a plurality of actors is disclosed. The method includes receiving an indication of a pending task that is assigned to an actor, determining if a follow-up communication, from a requestor, is appropriate, generating a follow-up communication to the actor, sending the follow-up communication to the actor, receiving feedback from the actor, determining if the feedback indicates that the actor will complete the assigned task, and if the feedback indicates that the actor will not complete the assigned task, recording a re-assignment of the task.

In some aspects of the present disclosure, a system is provided. The system includes at least one processor, and memory storing instructions that, when executed by the at least one processor, causes the system to perform a set of operations. The set of operations include receiving a request to generate a communication to an actor, regarding a task. The set of operations further include receiving an indication of the actor's emotional state, and a priority level of the task. The set of operations further include determining a style and mode of the communication, based on the emotional state of the actor, and the priority level of the task. The set of operations further include generating the communication to the actor, based on the determined style, and sending the communication to the actor, via the determined mode of communication.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 4 illustrates an overview of an example method for auto-managing requestor communication to accommodate diverse actors, according to aspects described herein.

DETAILED DESCRIPTION

Figure 1:
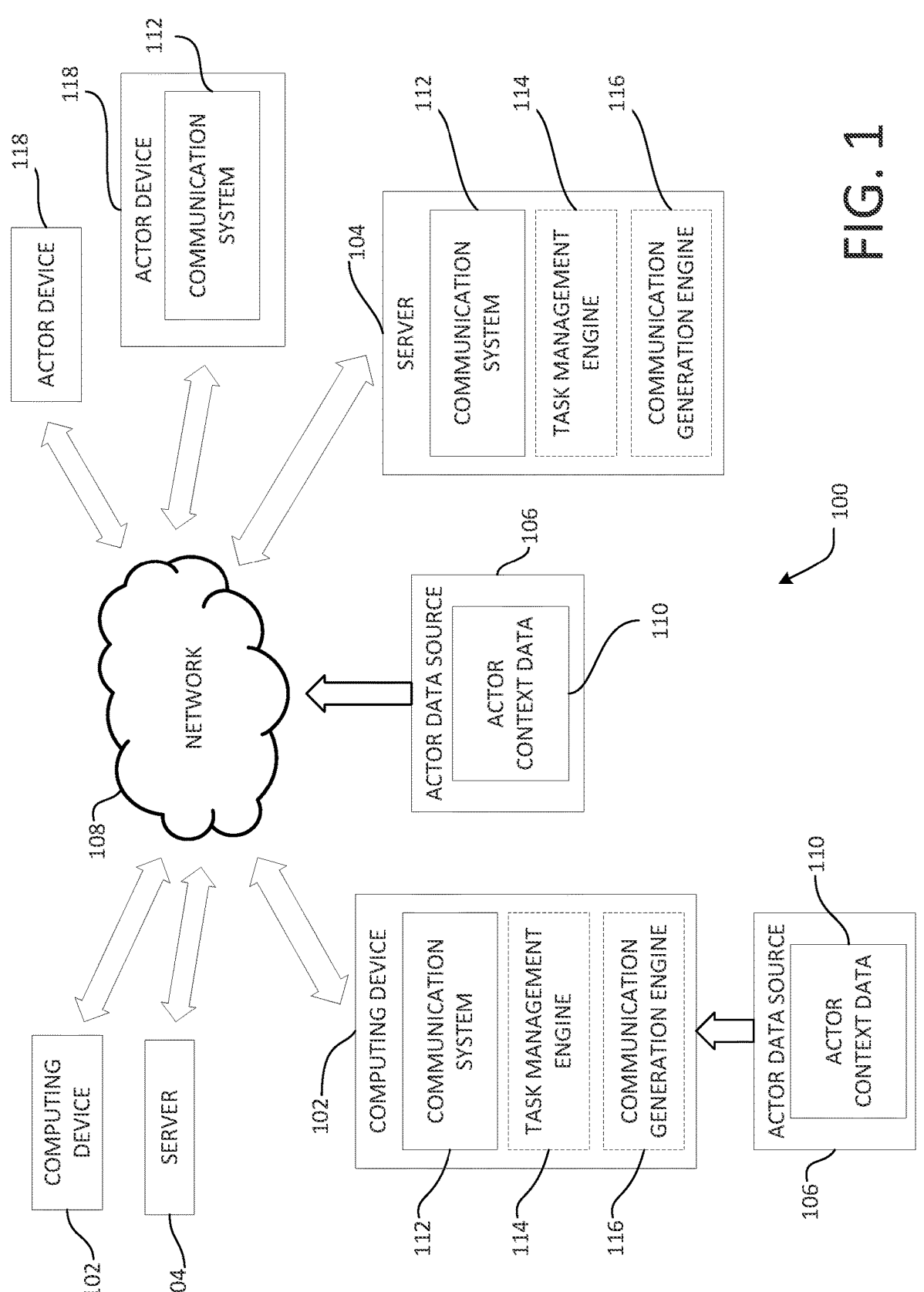
FIG. 1 illustrates an overview of an example system for auto-managing requestor communications to accommodate diverse actors according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As used herein, the term "requestor" refers to one who assigns an activity or task to one or more persons and follows up with the one or more persons, regarding the activity, if the activity is incomplete. For example, in some instances, an actor may be a supervisor, or a manager, or a parent, or a friend, or any other person who assigns a task or activity to be completed by one or more other people. As used herein, the term "actor" refers to one who is responsible for performing an assigned activity or task. For example, in some instances, an actor may be an employee, or a child, or a friend, or any other person who is assigned an activity or task to be completed.

It should be recognized while the terms "actor" and "requestor" may be assigned based on hierarchies (e.g., where a workplace superior, or an elder is the requestor, and a workplace subordinate, or a youngster is the actor). However, the terms "actor" and "requestor" are not always dependent on hierarchies (e.g., social, workplace, etc.). For instance, an employee can be a requestor and another employee can be an actor, such as when an employee is waiting on another employee to perform a task, such that progress on a project can continue. In another instance, a child can be a requestor, and a parent can be an actor, such as when a child needs a permission slip to be signed by the parent and may have to continuously remind the parent to sign the permission slip.

As mentioned above, when delegating or assigning activities, there are typically two roles: an actor (e.g., one who performs the activity) and a requestor (e.g., one who assigns the activity and follows up with the actor regarding the activity, if the activity is incomplete). Activities can include any kind of tasks from responding to an email, reviewing papers for an academic conference, or RSVP'ing to a birthday party.

Often, diverse actors with different communication styles may not complete their activities on time. For example, an actor may forget to complete an activity or an extenuating circumstance may have prevented the actor from completing the activity, such as, for example, a job change, a family emergency, time spent travelling, or any other circumstance that may prevent somebody from completing an activity that they were entrusted to complete. As a result, requestors may be required to spend a lot of time following up on activities (e.g., generating follow-up communications, figuring out the context behind why an actor is not completing an activity, sending follow-up communications, and re-sending follow-up communications, over time, if no responses are received).

For requestors, keeping track of and sending follow-up correspondence for activities can be challenging, time-consuming, cognitively demanding, and de-motivating. At the same time, communicating with actors regarding activities that the actors are to complete may require consideration of a range of factors that are not immediately apparent to the requestor. Such factors can include an actor's availability, an actor's workload, nature of the relationship between the actor and the requestor, urgency of the activity to be completed, etc.

Accordingly, aspects of the present disclosure relate to methods and systems for assisting a requestor to manage activities across diverse actors to accommodate the actor's needs and preferences. Aspects of the present disclosure leverage the nature of an activity, in combination with contextual knowledge regarding an actor, to auto-generate communications (or communication recommendations) and communication strategies (e.g., phone call, email, time of communication, etc.) to deliver the communication to an actor at a time, and in a manner, to accommodate the actor's need and preferences, while increasing a probability that the task will be accepted and/or completed by an actor, as described further herein. Accordingly, mechanisms described herein can increase a probability that requestor's activities will be completed, as well as maintain relationships between requestors and actors (e.g., by factoring emotional sentiment of actors into decisions).

Aspects of the present disclosure may accommodate diversity, cultural norms, company norms, extenuating circumstances of actors (as discussed above), etc. Such accommodations can increase the likelihood of an actor satisfactorily completing an activity, and can help in maintaining positive long-term relationships between the requestor and the actor. For instance, in some examples, a computing device receive actor context data, and a task from a requestor. The task may be assigned to an actor, based on the actor context data. A communication may be generated to request that the actor complete the assigned task. The communication may then be sent to the actor, and feedback may be received from the actor. If the feedback indicates that the actor has accepted the task, then a task management engine may be updated to indicate that the actor has accepted the task.

FIG. 1 shows an example of a system 100 for auto-managing requestor communications to accommodate diverse actors, in accordance with some aspects of the disclosed subject matter. The system 100 includes one or more computing devices 102, one or more servers 104, a plurality of actor devices 118, an actor data source 106, and a communication network or network 108. The computing device 102 can receive actor context data 110 from the actor data source 106, which may be, for example the actor themselves, a computer-executed program that receives prompts from a user, a database containing actor data (e.g., a human resources database), and/or a third-party database that is capable of sharing an actor's data, with their permission (e.g., a database of a social media application, calendar application, messaging application, email application, etc.). In examples, the actor data may only be collected upon receiving permission from the actor to do so. Additionally, or alternatively, the network 108 can receive actor context data 110 from the actor data source 106, which may be, for example the actor themselves, a computer-executed program that receives prompts from a user, a database containing actor data (e.g., a human resources database), and/or a third-party database that is capable of sharing an actor's data, with their permission (e.g., a database of a social media application, calendar application, messaging application, email application, etc.).

Computing device 102 may include a communication system 112, a task management engine or component 114, and a communication generation engine or component 116. In some examples, computing device 102 can execute at least a portion of task management component 114 to track workload of actors, track status of activities or tasks, and assign activities or tasks to actors, based at least in part on the actor context data 110. Further, in some examples, computing device 102 can execute at least a portion of communication generation component 116 to generate a communication from a requestor to an actor, asking the actor to complete an activity or task, based at least in part on the actor context data 110.

Server 104 may include a communication system 112, a task management component or engine 114, and a communication generation component or engine 116. In some examples, server 104 can execute at least a portion of task management component 114 to track workload of actors, track status of activities or tasks, and assign activities or tasks to actors, based at least in part on the actor context data 110. Further, in some examples, server 104 can execute at least a portion of communication generation component 116 to generate a communication from a requestor to an actor, asking the actor to complete an activity or task, based at least in part on the actor context data 110.

Additionally, or alternatively, in some examples, computing device 102 can communicate data received from actor data source 106 to the server 104 over a communication network 108, which can execute at least a portion of task management component 114, and/or communication generation component 116. In some examples, task management component 114 may execute one or more portions of methods/processes 400, 500, and/or 600 described below in connection with FIGS. 4, 5, and 6. Further, in some examples, communication generation component 116 may execute one or more portions of methods/processes 400, 500, and/or 600 described below in connection with FIGS. 4, 5, and 6.

In some examples, computing device 102 and/or server 104 can be any suitable computing device or combination of devices that may be used by a requestor, such as a desktop computer, a laptop computer, a smartphone, a tablet computer, a wearable computer, a server computer, a virtual machine being executed by a physical computing device, etc. Further, in some examples, there may be a plurality of computing device 102 and/or a plurality of servers 104, such as in examples where there are a plurality of requestors.

Actor device 118 may receive information from the computing device 102 and/or server 104 by way of the communication network 108. For example, one or more of the plurality of actor devices 118 may receive a communication that is generated by communication generation component 116 (of computing device 102 and/or server 104). Further, in some examples, the actor device 118 may send feedback to the network 108, via communication system 112, in response to the communication received from communication generation component 116.

In some examples, actor device 118 can be a type of computing device, such as a desktop computer, a laptop computer, a smartphone, a tablet computer, a wearable computer, a server computer, a virtual machine being executed by a physical computing device, etc. Additionally, or alternatively, actor device 118 can be a non-computing device, such as a landline telephone, cellular phone without computational functions, telegraph, etc.

While the illustrated example system 100 shows two computing devices 102 and two servers 104 that may be used by a requestor, as well as two devices 118 that may be used by an actor, it should be recognized that systems in accordance with aspects of the present disclosure may include any number of computing devices 102, servers 104, and/or actor devices 118. Further, the number of devices that correspond to one or more requestors may be greater than, equal to, or less than the number of devices that correspond to one or more actors. As such, mechanisms disclosed herein apply to context in which there may be a larger number of actors than a number of requestors, the same number of actors as a number of requestors, or a fewer number of actors than a number of requestors.

In some examples, actor data source 106 can be any suitable source of actor data (e.g., data generated from a computing device, data input by a user, such as an actor or requestor, data obtained from a human resources database, and/or data obtained from a third-party database that is capable of sharing an actor's data, with their permission, such as a database of a social media application, calendar application, messaging application, email application, etc.) In a more particular example, actor data source 106 can include memory storing actor context data (e.g., local memory of computing device 102, local memory of server

104, cloud storage, portable memory connected to computing device 102, portable memory connected to server 104, etc.).

In another more particular example, actor data source 106 can include an application configured to generate actor context data (e.g., a task management application with prompts that request information about an actor, and/or a communication generation application being executed by computing device 102, server 104, and/or any other suitable computing device). In some examples, actor data source 106 can be local to computing device 102. Additionally, or alternatively, actor data source 106 can be remote from computing device 102 and can communicate actor context data 110 to computing device 102 (and/or server 104) via a communication network (e.g., communication network 108).

In some examples, communication network 108 can be any suitable communication network or combination of communication networks. For example, communication network 108 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 108 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

Figure 2:
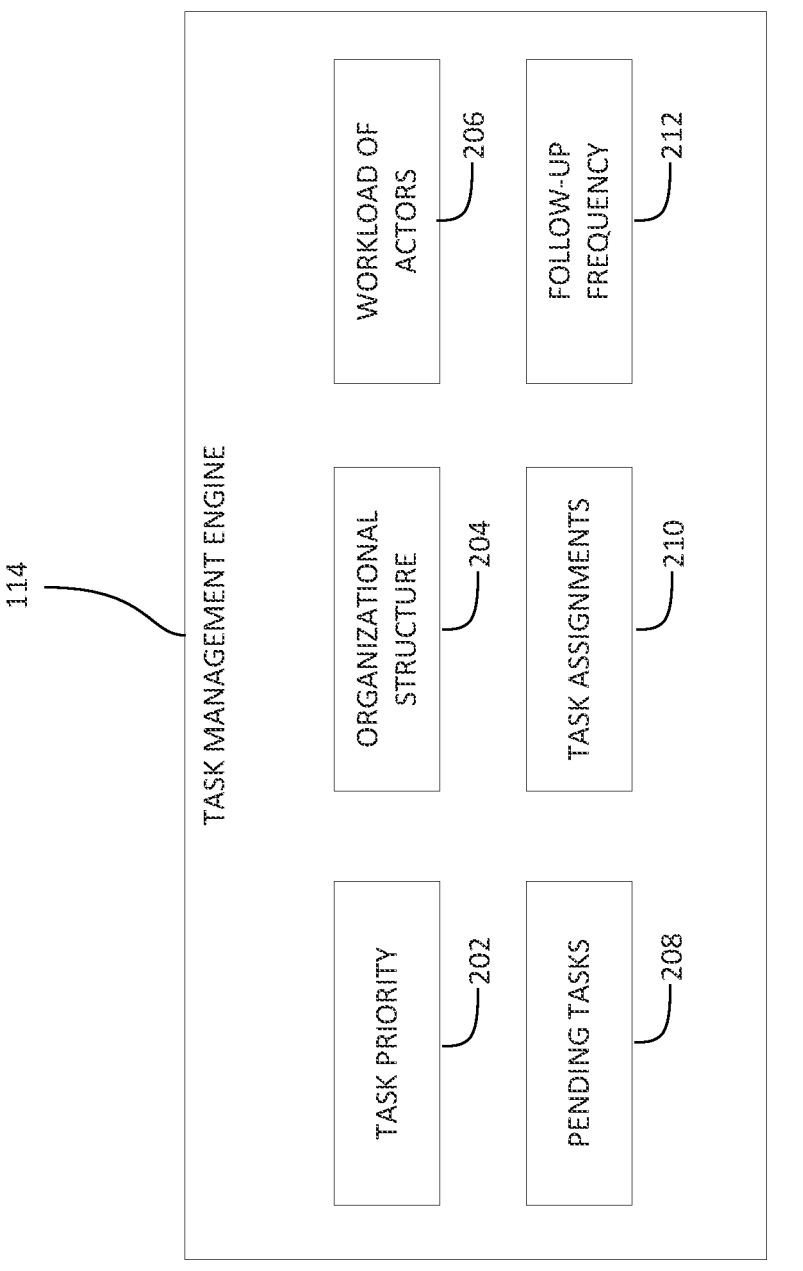
FIG. 2 illustrates a detailed schematic of a portion of the example system of FIG. 1 according to aspects described herein.

FIG. 2 illustrates a detailed schematic of the task management component or engine 114 of the example system 100 for auto-managing requestor communications to accommodate diverse actors. The task management component 114 includes a plurality of components or engines that track various aspects of the task management component 114. For example, the task management component can include a task priority component 202, an organizational structure component 204, a workload of actors component 206, a pending tasks component 208, a task assignments component 210, and/or a follow-up frequency component 212. The plurality of components of the task management component 116 may store information that is parsed from actor context data (e.g., actor context data 110).

The task priority component 202 may contain (e.g., stored in a memory location corresponding to the task priority component 202), and/or generate an indication of a priority level of each of one or more tasks. For example, tasks that are urgent, or of relatively high importance, may be labelled as high priority level tasks. Alternatively, tasks that are not urgent, or that are not critical complete on time, may be labelled as low priority level tasks. Alternatively, tasks that should be completed on time, but are neither high-priority, nor low priority, may be labelled as neutral priority level tasks. The priority level of tasks may be useful for a requestor to be aware of when determining how often to follow-up with an actor, what tone to use with an actor when following up (e.g., urgent, lax, etc.), or whether to re-assign a task if the actor displays an unwillingness or inability to complete the task on-time (e.g., if an actor is unable or unwilling to complete a high priority task on time, then the task may be reassigned to another actor, who is different from the originally assigned actor).

Further, in some examples, the priority level of a task can change over time. For example, as a task approaches a due date or deadline, the priority level of the task may increase (e.g., change from a low or neutral priority level to a high priority level). A change in the priority level of a task, over a duration of time, can increase the urgency in which a requestor may desire to communicate with an actor (e.g., the requestor may choose to contact the actor via a phone call, instead of a written communication).

The organizational structure component 204 may contain (e.g., stored in a memory location corresponding to the organizational structure component 204), and/or generate an indication of a workplace or social hierarchy that indicates the relationship between one or more actors and one or more requestors. For example, tasks may be assigned from a first requestor, who is a manager, to a plurality of actors, who are each subordinates of the manager. In some instances, it may be useful to understand the organizational structure in which tasks are being assigned, for example, such that tasks can be reassigned to individuals who are of the relatively same level in the organizational structure, or are within the same division of the organizational structure. If one or more actors work in the same divisions, then a requestor may be able to assign tasks that require knowledge of such division to any one of the one or more actors in the division. Further, in some instances, if an actor and requestor have a strenuous relationship (e.g., based on information gathered regarding a nature of the relationship between the actor and requestor), then another requestor (e.g., another supervisor, another parents, etc.) may contact the actor to request that a task be completed.

The workload of actors component 206 may contain (e.g., stored in a memory location corresponding to the workload of actors component 206), and/or generate an indication of a number of tasks that are assigned to each of one or more actors. If a first actor has a relatively high workload, then if a requestor has a new task to assign, the requestor may assign the task to a second actor with a relatively low workload, based on information received from the workload of actors components 206. Conversely, if a first actor has a relatively low workload, then if a requestor has a new task to assign, the requestor may assign the task to the first actor, instead of a second actor who has a relatively high workload.

The pending tasks component 208 may contain (e.g., stored in a memory location corresponding to the pending tasks component 208), and/or generate an indication of a pending tasks of which the requestor is aware (e.g., tasks that are already assigned to actors and/or tasks that are not-yet assigned to actors). The pending tasks component 208 may also contain or generate an indication of when tasks are supposed to be completed (e.g., deadlines of the pending tasks), such that mechanisms disclosed herein can generate indications of pending tasks to prompt potential follow-up communications between requestors and actors, regarding a status of the pending tasks.

The task assignments component 210 may contain (e.g., stored in a memory location corresponding to the task assignments component 210), and/or generate an indication of to whom one or more tasks are assigned (e.g., to which actor, in instances where there are a plurality of actors). In some instances, the task assignment component 210 may further contain or generate an indication of by whom one or more tasks were assigned (e.g., by which requestor, in instance where there are a plurality of requestors). The task assignments component 210 can be useful in determining from who (e.g., which requestor) communications regarding a task should be generated, and to who (e.g., which actor)

communications regarding a task should be sent. Additionally, or alternatively, the task assignment component 210 can indicate which data from actor context data (e.g., actor context data 110) is relevant when communicating with an actor. For example, when communicating with a first actor from a plurality of actors, systems disclosed herein may only want to reference data from the actor context data 110 that corresponds to the first actor.

Follow-up frequency component 212 may contain (e.g., stored in a memory location corresponding to follow-up frequency component 212), and/or generate an indication of a follow-up frequency for one or more actors who are each assigned one or more tasks. If a first actor, from a plurality of actors, is known to be reliable, then a requestor may not follow-up with the first actor as often as, perhaps, a second actor who is known to be unreliable. Conversely, if a first actor, from a plurality of actors, is known to be unreliable, then a requestor may follow-up with the first actor more often than a second actor who is known to be reliable. Follow-up frequencies may be based on actor-preference (e.g., some actors may prefer to be regularly checked-in with regarding tasks), requestor-preference (e.g., some requestors may prefer to check-in with actors at specific intervals), or on relationships between actors and requestors (e.g., if an actor and a requestor have a positive longstanding working relationship, then follow-ups may occur less often than between an actor and a requestor who have a negative working relationship, or are newly working together).

In some examples of the present disclosure, an actor may be assigned a plurality of tasks. In such instances, the task management component 114 may rank the plurality of tasks assigned to the actor. For example, the plurality of tasks may be ranked by task priority (e.g., where high priority tasks are ranked higher than neutral priority tasks and low priority tasks, and neutral priority tasks are ranked higher than low priority tasks). Additionally, or alternatively, the plurality of tasks may be ranked by an importance of the requestor from whom each of the plurality of tasks were assigned. For example, if a first task is assigned from someone who is of relatively high importance in an organizational structure, then the first task may be ranked higher than a second task, wherein the second task is assigned from someone who is of relatively low importance in an organizational structure. As a further example, a first task may be ranked higher than a second task, if a requestor is following up on the first task (e.g., based on the follow-up frequency component 212) more often than a requestor is following up on the second task (e.g., based on the follow-up frequency component 212). Additional methodologies for ranking tasks, should be apparent to those of ordinary skill in the art, based on the above examples, the above disclosed components 202-212, knowledge available to those of ordinary skill in the art, and combinations thereof.

It should be recognized that while the task management component 114 provides examples of numerous components that may be used to assist a requestor in assigning tasks to an actor, in other examples, fewer or additional components may be included. For instance, components of conventional task management systems that are known to those of ordinary skill in the art may be incorporated with aspects of the task management component 114.

Figure 3:
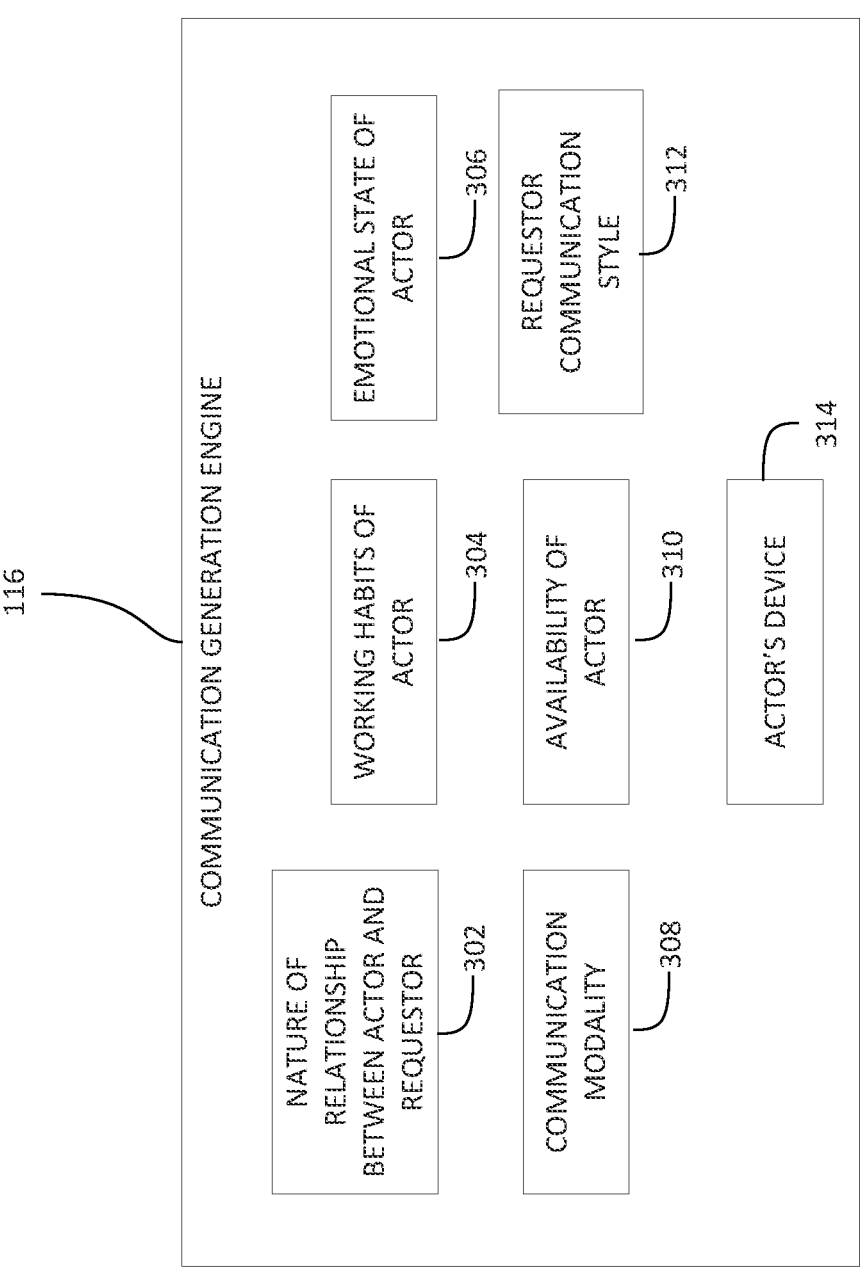
FIG. 3 illustrates a detailed schematic of a portion of the example system of FIG. 1 according to aspects described herein.

FIG. 3 illustrates a detailed schematic of the communication generation component or engine 116 of the example system 100 for auto-managing requestor communications to accommodate diverse actors. The communication generation component 116 includes a plurality of components or engines that track various aspects of the communication generation component 116. For example, the communication generation component can include a nature of relationship between actor and requestor component 302, working habits of actor component 304, emotional state of actor component 306, a communication modality component 308, availability of actor component 310, requestor communications styles component 312, and/or an actor's device component 314. The plurality of components of communication generation component 116 may store information that is parsed from actor context data (e.g., actor context data 110).

The nature of relationship between actor and requestor component 302 may contain (e.g., stored in a memory location corresponding to the nature of relationship between actor and requestor component 302), and/or generate an indication of the nature of a relationship between an actor and a requestor. For example, if a requestor and an actor have a formal relationship (e.g., as may be found between a supervisor and a subordinate), then the communication generation engine 116 may rely upon information provided by the nature of relationship between actor and requestor component 302 to generate a formal communication (e.g., a communication that is drafted to sound or look formal). Alternatively, if a requestor and an actor have an informal relationship (e.g., as may be found between two friends, family members, etc.), then the communication generation engine 116 may rely upon information provided by the nature of relationship between actor and requestor component 302 to generate an informal communication (e.g., a communication that is drafted to sound or look informal).

In some examples, the nature of relationship between actor and requestor component 302 may also indicate whether requestors and actors have a positive, negative, or neutral relationship with each other. Such information can be useful in determining which requestors can request tasks to be completed by certain actors to improve a likelihood that the actor will accept and/or complete the task (e.g., if a first requestor has a negative relationship with a first actor, then a communication may be generated from a second requestor to the first actor, wherein the second requestor has a positive relationship with the first actor).

The working habits of actor component 304 may contain (e.g., stored in a memory location corresponding to the working habits of actor component 304), and/or generate an indication of working habits of an actor, such as, for example standard business hours for the actor, or hours during which the actor is known to be awake. If an actor is known to be unlikely to respond to communications outside of business hours, or when they are asleep, it would increase the probability of receiving a response from the actor, if a requestor were to send a communication to the actor, during business hours, or when the actor is known to be awake.

The emotional state of actor component 306 may contain (e.g., stored in a memory location corresponding to the emotional sematic of actor component 306), and/or generate an indication of an emotional state of an actor, based on emotional semantics of information corresponding to the actor. For example, mechanisms disclosed herein may analyze, with an actor's permission, emails, messages, social media posts, or other communications to determine an emotional state of the actor, based on semantic analysis (e.g., using machine-learning natural language processors that output one or more sentiment scores to determine an actor's emotional state). The emotional state of the actor may be positive (e.g., happy, joyful, hopeful, excited, etc.). Alternatively, the emotional state of the actor may be negative (e.g., sad, angry, frustrated, etc.).

Generally, understanding an emotional state of an actor may influence the way in which a requestor communicates with an actor to assure that a task will be completed and/or that a relationship between the actor and the requestor will be maintained. According to some aspects of the present disclosure, the goal may be to complete tasks. Additionally, or alternatively, according to some aspects of the present disclosure, the goal may be to maintain relationships with actors.

The communication modality component 308 may contain (e.g., stored in a memory location corresponding to the communication modality component 308), and/or generate an indication of a preferred mode of communication between a requestor and an actor. For example, some actors may prefer visual communications (e.g., an email, instant message, application notification, etc.). Alternatively, some actors may prefer audio communications (e.g., a phone call, audio file, etc.). Such preferred modes of communication may be beneficial to consider when a requestor desires to generate a communication to an actor. For example, if actor context data indicates that an actor dislikes phone calls, and the actor is in a negative emotional state (based on information provided by the emotional state of actor component 306), then to preserve a relationship with the actor, a requestor may determine not to call the actor. Other examples of communication modalities and benefits of tracking preferences thereof may be recognized by those of ordinary skill in the art.

Still referring to the communication modality component 308, if the priority level of a task changes (e.g., based on the task priority component 202), then the mode of communication between the requestor and the actor may change. In some examples, if the priority level of a task changes, over a duration of time, then the modality of communication changes, based on the change in the priority level. For example, if an actor is not completing a task, and the deadline for the task is approaching, then the modality of communication (e.g., as generated by communication modality component 308) may change from a written communication (e.g., email, application notification, etc.) to an audio communication (e.g., a phone call).

The availability of actor component 310 may contain (e.g., stored in a memory location corresponding to the availability of actor component 310), and/or generate an indication of whether an actor is available, or whether an actor is unavailable. Actors may be less likely to respond to communications (e.g., communications from requestors) if they are currently offline from a specific network (e.g., a work network, a home network, etc.), or if they are currently travelling (e.g., on an airplane, driving a car, etc.). Therefore, availability of actor component 310 may receive actor context data indicative of whether an actor is currently connected to a desired communication network, whether the actor is currently stationary, and/or whether the actor is otherwise available to perform a task that is requested by a requestor. In some examples, the availability of actor component 310 may receive data from an actor's device (e.g., actor device 118) indicative of whether the actor's device is connected to a network (e.g., based on network connectivity), whether the actor's device is moving (e.g., based on location data received from a global positioning system or GPS of the actor's device), or whether the actor is otherwise available (e.g., using any other settings or sensors that may be available on an actor's device and accessible, with their permission).

The requestor communication style component 312 may contain (e.g., stored in a memory location corresponding to the requestor communication style component 312), and/or generate an indication of a communication style of a requestor. The requestor communication style may be a tone in which the communication is drafted (e.g., urgent, formal, informal, lax, etc.). For example, if the priority level of the task is the high priority level, and the emotional state of the actor is positive, then the requestor communication style generated by the requestor communication style component 312 may be relatively urgent. Alternatively, if a priority level of the task is the low priority level, and an emotional state of the actor is negative, then the requestor communication style generated by the requestor communication style component 312 may be relatively lax (e.g., a friendly reminder). Further, if a priority level of a task changes, over a duration of time, then the requestor communication style may change, based on the change in the priority level (e.g., if a task priority level changes from low to high, because an actor has not completed the task, then the requestor communication style may change from lax to urgent).

Still referring to the requestor communication style component 312, the requestor communication style component 312 may provide, or generate an indication of a person-specific style of how a requestor typically drafts communications. For example, if a requestor tends to use the same greetings, or closing phrases, then those same tendencies may be incorporated into a communication that is generated (e.g., by the communication generation engine 116). In this respect, the generated communication may mimic the writing-style or speaking-style (e.g., semantics) of a requestor, when the requestor is communicating with an actor.

The actor's device component 314 may contain (e.g., stored in a memory location corresponding to the actor's device component 314), and/or generate an indication of which device (e.g., actor device 118) an actor is currently using and/or typically uses. For example, an actor may have a telephone, a smartphone, a smartwatch, a laptop computer, and a desktop computer. However, when generating a communication, via communication generation engine 116, it may be beneficial to know which of the actor's devices the actor is currently using, or typically uses. Accordingly, a communication can be generated that is sent to the device that the actor is currently using, or typically uses (e.g., an application notification on a smartphone or smartwatch, a phone call to a smartphone or telephone, an email to a laptop computer and/or a desktop computer, etc.), such that the communication is likely to be received by the actor in a timely manner.

As mentioned earlier herein, the communication generation component 116 may receive data, such as actor context data 110 to generate or store indications related to each of the components 302-316 of the communication generation component 116. Additionally, or alternatively, the communication generation component 116 may include one or more models, such as machine-learning models that are trained to generate communications by receiving information corresponding to, for example, components 302-314, and generating a communication, based on the received information. For example, a machine-learning model may be trained to adapt information corresponding to one or more components (e.g., components 302-314) of the communication generation component 116 to increase a probability that actors will accept and complete tasks. In this respect, communications may be generated by a trained model (e.g., a trained machine learning model) that is trained to increase a probability that actors accept and complete tasks, based on type of communication that the actors receive (e.g., after the communications are generated by the communication generation component 116).

Additionally, or alternatively, the communication generation component 116 may be trained to generate communications using reinforcement learning. For example, the communication generation component 116 may generate a proposed communication, from a requestor to an actor. The requestor may then modify the proposed communication (e.g., change a tone of the proposed communication from lax to urgent, or vice versa, or change a style from informal to formal, or vice versa) before the communication is sent to the actor. Mechanisms disclosed herein may update one or more trained models that are associated with the communication generation component 116, based on the modifications that the requestor made to the proposed communication (e.g., to assure that a tone of the proposed communication is appropriately lax/urgent in a similar situation, and/or that the style of the communication is appropriately formal/informal in a similar situation, etc.). Alternatively, aspects of the proposed communication that are unchanged before being sent by a requestor may also influence the training of machine-learning models (e.g., by maintaining weights associated with the aspects that were unchanged by the requestor).

FIG. 4 illustrates an overview of an example method for auto-managing requestor communication to accommodate diverse actors, according to aspects described herein. In examples, aspects of method 400 are performed by a device, such as computing device 102, server 104, and/or actor device 118 discussed above with respect to FIG. 1.

Method 400 begins at operation 402, where a request for a task or activity to be completed is received. For example, a requestor may enter a task or activity into a task management system (e.g., task management component 114). Additionally, or alternatively, a requestor may send an email, or another written communication, that is indicative of a task that needs to be completed, based on, for example key-word indicators, a natural language processor, embedded commands, etc. Additionally, or alternatively, a requestor may provide a verbal command that is indicative of a task that needs to be completed. Additionally, or alternatively, a requestor may provide user-input to a computing device that is indicative of a task that needs to be completed.

At determination 404, it is determined whether actor context data has been provided with the request from operation 402. For example, the actor context data may be received via an actor data source (e.g., actor data source 106 discussed above with respect to FIG. 1). As mentioned above, the actor data source may be, for example data generated from a computing device, data input by a user, such as an actor or requestor, data obtained from a human resources database, and/or data obtained from a third-party database that is capable of sharing an actor's data, with their permission, such as a database of a social media application, calendar application, messaging application, email application, etc.

If it is determined that actor context data was not provided with the request of operation 402, flow branches "NO" to operation 406, where actor context data is obtained. For example, systems disclosed herein may execute commands, via a processor, that cause actor context data to be received, such as by generating prompts for a user to enter actor context data (e.g., working habits of actors, availability of actors, emotional state of actors, nature of relationships between actors and the requestor, preferred communication modalities of actors, workload of actors, current task assignments of actors, etc.). Additionally, or alternatively, systems disclosed herein may obtain actor context data from one or more databases that are local to a computing device (e.g., computing device 102, server 104, and/or actor device 118) and/or from one or more databases that are remote from a computing device. For example, actor context data may be obtained, with actors permission, from a human resources database, a social media database, a calendar database, a messaging application database, an email database, etc. Method 400 may terminate at operation 406, if actor context data is unable to be retrieved. Alternatively, method 400 may advance to operation 408, wherein an assignment of the task to an actor, based on the actor context data, is recorded.

If however, it is determined that actor context data is provided with the request, flow instead branches "YES" to operation 408, wherein an assignment of the task to an actor, based on the actor context data, is recorded (e.g., stored in memory corresponding to the task management component 114). For example, the task may be assigned to an actor based on workload of actors (e.g., as discussed with respect to the workload of actor component 206 of FIG. 2), or based on task assignments (e.g., as discussed with respect to the task assignments components 210 of FIG. 2), or based on working habits (e.g., as discussed with respect to the working habits of actor component 304 of FIG. 3), or based on an availability of an actor (e.g., as discussed with respect to the availability of actor component 310 of FIG. 3), etc. The task may be assigned by a requestor (e.g., based on the requestors review of one or more aspects of the actor context data, and/or a recommendation provided by mechanisms disclosed herein, based on the actor context data). Accordingly, operation 408 may include receiving an indication of a task assignment to an actor, based on the actor context data. Alternatively, the task may be automatically assigned by systems disclosed herein, based on the actor context data.

Flow advances to operation 410, wherein a communication is generated to request that the actor (chosen and/or recorded from operation 408) complete the assigned task. For example, the communication may be generated by communication generation engine 116. In some examples, the generated communication is a visual communication (e.g., one of an email, instant message, or application notification to the actor). Additionally, or alternatively, in some examples, the generated communication is an audio communication (e.g., an audio file that can be transmitted via email, instant message, or an application, or that can be transmitted via a phone call).

Additionally, or alternatively, the communication may be generated using one or more components, or accounting for one or more aspects discussed earlier herein with respect to the communication generation component 116 of FIG. 3. For example, the communication may be generated based on one or more from the group of: nature of the relationship between the actor and the requestor (e.g., as discussed with respect to the nature of relationship between actor and requestor component 302 of FIG. 3), working habits of the actor (e.g., as discussed with respect to the working habits of actor component 304 of FIG. 3), emotional semantics of the actor (e.g., as discussed with respect to the emotional state of actor component 306 of FIG. 3), communication modality (e.g., as discussed with respect to the communication modality component 308 of FIG. 3), availability of the actor (e.g., as discussed with respect to the availability of actor component 310 of FIG. 3), task priority (e.g., as discussed with respect to the task priority component 202 of FIG. 2), actor's device (e.g., as discussed with respect to actor's device component 314 of FIG. 3), and a communication style of the requestor (e.g., as discussed with respect to the requestor communication style component 312 of FIG. 3).

Flow advances to operation 414, wherein the communication is sent to the actor. For example, if the communication is a visual communication, then operation 414 may include sending one of an email, instant message, or application notification to the actor to deliver the visual communication. Alternatively, if the communication is an audio communication, then operation 414 may include calling the actor to deliver the audio communication. The method of communicating to the actor may be determined by aspects of a communication generation engine, such as communication modality 308 of communication generation engine 116.

Actors may be less likely to respond to communications from a requestor if they are unavailable. For example, in industry settings, an actor may be less likely to respond to communications that are sent outside of the actor's standard working hours. As a further example, actors may be less likely to respond to communications if they are currently offline from a specific network (e.g., a work network, a home network, etc.), or if they are currently travelling (e.g., on an airplane, driving a car, etc.). Therefore, sending the communication to the actor could include sending the communication, based on working habits of the actor (e.g., working habits of the actor 304) and availability of the actor (e.g., availability of the actor 310).

Flow advances to operation 414 where feedback is received from the actor. The feedback from the actor may be visual feedback (e.g., one of an email, instant message, or application notification, such as in response to a corresponding one of an email, instant message, or application notification, received by the actor, on behalf of the requestor). Alternatively, the feedback from the actor may be audio feedback (e.g., a voice response to a phone call).

In some instances, it is considered that an actor may not provide any feedback. For example, an actor may no longer be employed at a business, and a requestor mistakenly tried to assign a task to them. In other examples, an actor may be unavailable, or simply ignoring the request from the requestor. In such instances, operation 412 may skip to determination 416, after a specified duration of time (e.g., an hour, a day, a week, etc.), and flow from determination 416 would branch "NO", since no feedback was received. It should be noted that the specified duration of time required to skip operation 414 may depend on a level of priority or urgency assigned to the task (e.g., corresponding to information of task priority 202).

Flow advances to determination 416, wherein it is determined whether the feedback of operation 414 indicates that the actor has accepted the task. In some examples, the communication that was sent to the actor may provide instructions for how the actor may respond to indicate that they have accepted the task. Potential responses to indicate the actor has accepted the task may be, for example, a written "YES", or "Y", or "Sure", or "I accept", or the like. In other examples, potential responses to indicate that the actor has accepted the task may be, for example, a spoken "YES", or "Sure", or "I accept", or the like. Further, in some examples, a natural language processor may be used to interpret whether the feedback provided by the actor is indicative of the actor having accepted the task, or alternatively, whether the feedback provided by the actor is indicative of the actor having not accepted the task.

If it is determined that the actor has accepted the task, based on the determination 416, flow advances "YES" to operation 420, wherein a task management system or engine or component (e.g., task management component 114) is updated to which actor the task is assigned. Specifically, with regard to the system 100, task assignment component 210 may be updated to store a record or indication (e.g., in memory) of to which actor the task is assigned. Accordingly, workload of actor component 206 may be updated to indicate the increased workload of the actor. Further, pending tasks component 208 may be updated to indicate that the actor has a pending task assigned to them. Based on the information available in the task management system (e.g., task management component 114), systems disclosed herein can help to auto-manage follow-up communications with the actor as discussed further herein.

Figure 5:
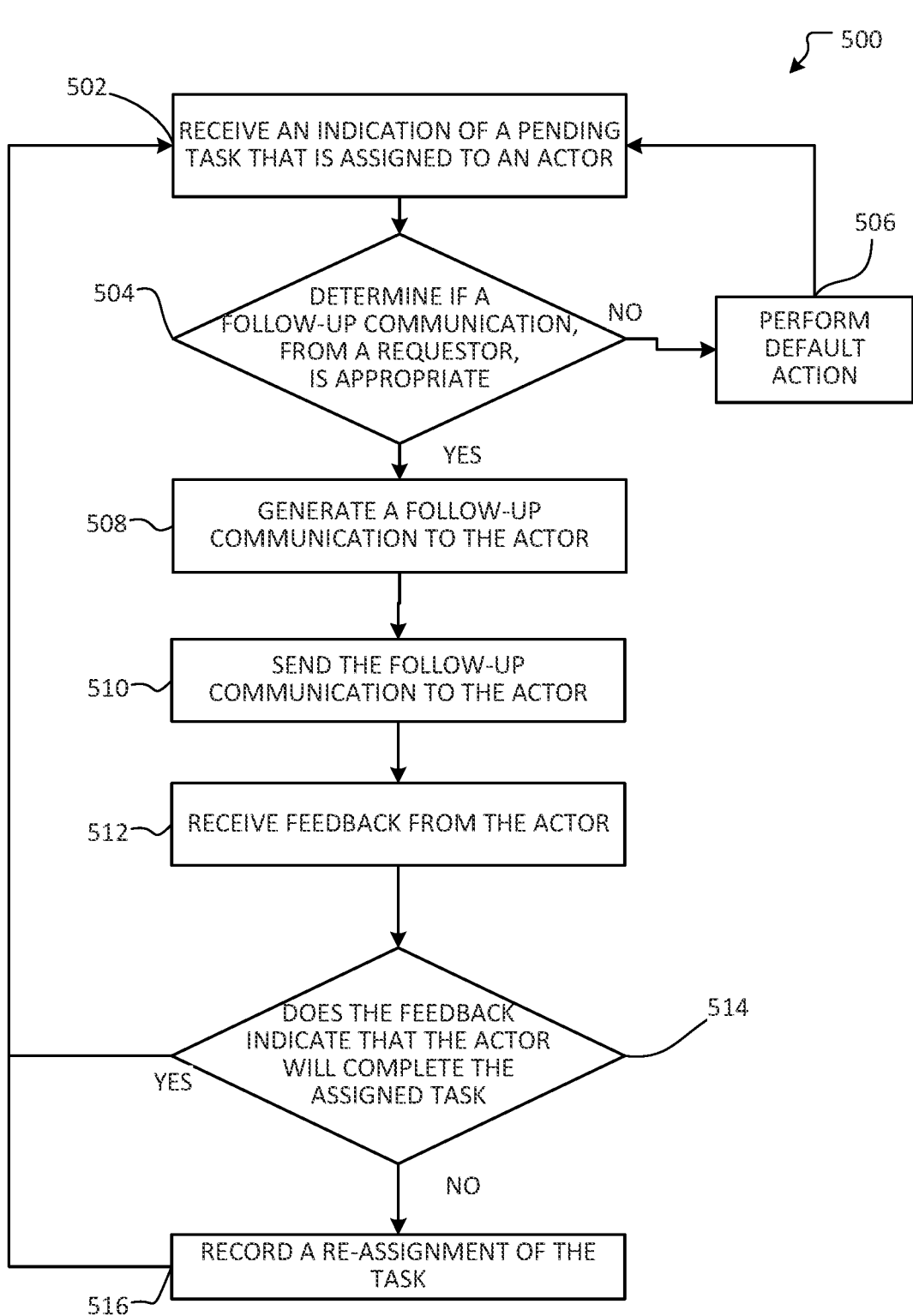
FIG. 5 illustrates an overview of an example method for auto-managing requestor communication to accommodate diverse actors, according to aspects described herein.

FIG. 5 illustrates an overview of an example method 500 for auto-managing requestor communication to accommodate diverse actors, according to aspects described herein. In examples, aspects of method 500 are performed by a device, such as computing device 102, server 104, and/or actor device 118 discussed above with respect to FIG. 1.

Method 500 begins at operation 502, where an indication is received of a pending task that is assigned to an actor. For example, a task management system or component or engine (e.g., task management component 114) may provide regular updates to a requestor of pending tasks that are assigned to actors. Additionally, or alternatively, the task management system may provide updates to a requestor based on approaching deadlines of pending tasks. Additionally, or alternatively, the task management system may provide an indication of pending tasks, when prompted to do so by a user of the task management system, such as a requestor.

At determination 504, it is determined if a follow-up communication, from a requestor, is appropriate. In workplace environments, if an employee is dependable, and a manager is trusting, then the manager may not have to follow-up with the employee regarding any tasks, unless, perhaps, a deadline is missed. However, in the same workplace environment, if an employee is not dependable, or the employee is new and therefore not yet trusted by a manager, then the manager may want to schedule follow-ups with the employee at regular intervals. The present disclosure provides mechanisms by which a requestor (e.g., a manager) may evaluate whether a follow-up communication is appropriate for an actor (e.g., an employee).

The actor may have corresponding actor context data (e.g., actor context data 110). An indication of aspects of the actor context data may be provided by, for example, a task management component (e.g., task management component 114), and/or a communication generation engine (e.g., communication generation component 116). The actor context data may include an indication of a workload of the actor, how many tasks the actor is assigned, the priority of each task that the actor is assigned, etc. Therefore, systems disclosed herein may determine whether a follow-up communication is appropriate based on the workload of the actor, how many tasks the actor is assigned, and/or the priority of each task that the actor is assigned.

Additionally, or alternatively, some actors may have set follow-up frequencies (e.g., based on actor-preference, requestor-preference, past experiences of the actor and requestor working together, etc.). Determining if a follow-up communication is appropriate at determination 504 may include comparing a duration since a previous communication (e.g., a communication between the actor and requestor) to a follow-up frequency (e.g., as indicated by the follow-up frequency component 212). The follow-up frequency may be based on actor context data that corresponds to the actor.

If the duration is greater than or equal to the follow-up frequency, then flow may advance to operation 508.

If it is determined that a follow-up communication is not appropriate, flow branches "NO" to operation 506, a default action is performed. For example, the requestor may have an associated pre-configured action (such as not contacting the actor). In other examples, method 500 may comprise determining whether either of the actor or requestor have an associated default action, such that, in some instances, no action may be performed as a result of the received indication of a pending task that is assigned to the actor. Method 500 may terminate at operation 506. Alternatively, method 500 may return to operation 502 to provide an iterative loop of receiving an indication of pending tasks and determining whether or not a follow-up communication from a requestor is appropriate.

If however, it is determined that actor context data is provided with the request, flow instead branches "YES" to operation 508, wherein a follow-up communication to the actor is generated. For example, the follow-up communication may be generated by communication generation engine 116. In some examples, the generated follow-up communication is a visual communication (e.g., one of an email, instant message, or application notification to the actor). Additionally, or alternatively, in some examples, the generated follow-up communication is an audio communication (e.g., an audio file that can be transmitted via email, instant message, or an application, or that can be transmitted via a phone call). The follow-up communication may be generated at operation 510 in a similar manner as the communication that is generated at operation 410.

Flow advances to operation 510, wherein the follow-up communication is sent to the actor. For example, if the follow-up communication is a visual communication, then operation 510 may include sending one of an email, instant message, or application notification to the actor to deliver the visual communication. Alternatively, if the follow-up communication is an audio communication, then operation 510 may include calling the actor to deliver the audio communication. The method of communicating to the actor may be determined by aspects of a communication generation engine, such as the communication modality 308 of communication generation engine 116.

Actors may be less likely to respond to follow-up communications from a requestor if they are unavailable. For example, in workplace settings, an actor may be less likely to respond to follow-up communications that are sent outside of the actor's standard working hours. As a further example, actors may be less likely to respond to follow-up communications if they are currently offline from a specific network (e.g., a work network, a home network, etc.), or if they are currently travelling (e.g., on an airplane, driving a car, etc.) Therefore, sending the follow-up communication to the actor could include sending the follow-up communication, based on working habits of the actor (e.g., working habits of the actor 304) and availability of the actor (e.g., availability of the actor 310).

Flow advances to operation 512 where feedback is received from the actor. The feedback from the actor may be visual feedback (e.g., one of an email, instant message, or application notification, such as in response to a corresponding one of an email, instant message, or application notification, received by the actor, on behalf of the requestor). Alternatively, the feedback from the actor may be audio feedback (e.g., a voice response to a phone call).

In some instances, it is considered that an actor may not provide any feedback. For example, an actor may no longer be employed at a business, and a requestor mistakenly forgot to re-assign a task from them. In other examples, an actor may be unavailable, or simply ignoring the request from the requestor. In such instances, operation 510 may skip to determination 514, after a specified duration of time (e.g., an hour, a day, a week, etc.), and flow from determination 514 would branch "NO", since no feedback was received. It should be noted that the specified duration of time required to skip operation 512 may depend on a level of priority or urgency assigned to the task (e.g., corresponding to information of task priority 202).

Flow advances to determination 514, wherein it is determined whether the feedback of operation 512 indicates that the actor will (or still intends to) complete the assigned task. In some examples, the communication that was sent to the actor may provide instructions for how the actor should respond to indicate that they will complete the assigned task. Potential responses to indicate the actor will complete the task may be, for example, a written "YES", or "Y", or "Sure", or "I will", or the like. In other examples, potential responses to indicate that the actor has accepted the task may be, for example, a spoken "YES", or "Sure", or "I will", or the like. Further, in some examples, a natural language processor may be used to interpret whether the feedback provided by the actor is indicative of the actor intending to complete the task, or alternatively, whether the feedback provided by the actor is indicative of the actor not intending to complete the task.

If it is determined that the actor will complete the task, based on the determination 514, flow advances "YES" and returns to operation 502. Alternatively, in some examples, method 500 may terminate, when flow branches "YES".

If however, it is determined, from the received feedback of operation 512, or by default of no feedback received from operation 512, that the actor will not complete the assigned task, flow instead branches "NO" to operation 516, wherein a reassignment of the task is recorded (e.g., in memory, such as memory corresponding to the task management component 114). For example, a new request for the task to be completed may be passed to operation 402 of method 400. Further, an actor context data corresponding to the actor of method 500 may be updated to indicate that the actor is unable to complete the task (thereby ensuring that the actor does not get re-assigned the same task, but rather another actor is assigned the task). Method 400 may then execute, as described above, to record a reassignment of the task at operation 516. Method 500 may terminate at operation 516. Alternatively, method 500 may return to operation 502 to provide an iterative loop of receiving an indication of pending tasks and determining whether a follow-up communication from a requestor is appropriate.

Figure 6:
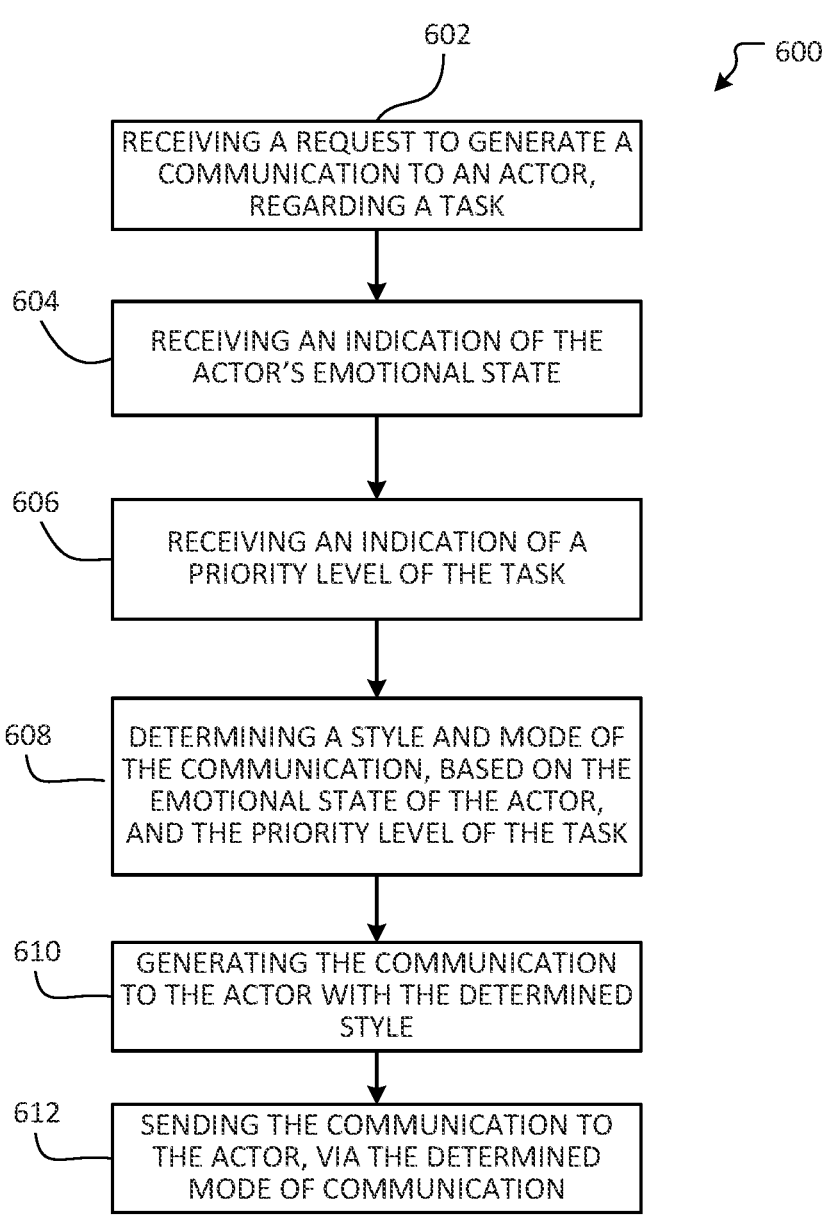
FIG. 6 illustrates an overview of an example method for auto-managing requestor communication to accommodate diverse actors, according to aspects described herein.

FIG. 6 illustrates an overview of an example method 600 for auto-managing requestor communication to accommodate diverse actors, according to aspects described herein. In examples, aspects of method 600 are performed by a device, such as computing device 102, server 104, and/or actor device 118 discussed above with respect to FIG. 1.

Method 600 begins at operation 602, where a request to generate a communication to an actor, regarding a task, is received. The operation 602 may be executed by a communication generation component (such as, for example, communication generation component 116). Additionally, or alternatively, operation 602 may be executed as a subprocess of operations 410 or operation 508, discussed with respect to FIGS. 4 and 5.

Flow advances to operation 604, wherein an indication of the actor's emotional state is received. The indication of the actor's emotional state may be received from aspects of systems disclosed herein that detect or otherwise receive an emotional state of the actor (e.g., via emotional state of actor component 306). The emotional state of the actor may be detected from communications received from the actor, or other contextual information corresponding to the actor, such as contextual information that may be contained within actor context data 110. For example, data obtained from a human resources database, a social media database, and/or emails between the actor and one or more individuals may allow for emotional semantics to be detected, and an emotional state to be determined.

The emotional state of the actor may be positive (e.g., happy, joyful, hopeful, excited, etc.). Alternatively, the emotional state of the actor may be negative (e.g., sad, angry, frustrated, etc.). Understanding an emotional state of the actor may influence a way to communicate with the actor to ensure that a task will be completed and/or that a relationship between the actor and the requestor will be maintained. According to some aspects of the present disclosure, the goal may be to complete tasks. Additionally, or alternatively, according to some aspects of the present disclosure, the goal may be to maintain relationships with actors.

Flow advances to operation 606, wherein an indication of a priority level of a task is received. A task may have a high priority level (e.g., the task may be urgent, or completion of the task is guaranteed), the task may have a neutral priority level (e.g., the task should be completed on time), or the task may have a low priority level (e.g., the task should be completed on time, but timely completion of the tasks may be less important than timely completion of other tasks that are higher priority).

Flow advances to operation 608, wherein a style and mode of requested communication are determined, based on the emotional state of the actor (from operation 604) and the priority level of the task (from operation 606). With respect to the style of communication, the style may be urgent, lax, assertive, passive, or a variety of other types of communication styles, such as tones, or person-specific tendencies that may be recognized by those of ordinary skill in the art. For example, if the priority level of the task is the high priority level, and the emotional state of the actor is positive, then the determined style of the communication may be relatively urgent. Alternatively, if the priority level of the task is the low priority level, and the emotional state of the actor is negative, then the determined style of the communication may be relatively lax (e.g., a friendly reminder).

With respect to the determined mode of the requested communication, the mode may be determined based on the priority level of the task. For example, if the priority level of the task is a high priority level, then the determined mode of communication may be an audio communication (e.g., a phone call). Alternatively, if the priority level of the task is a low priority level, then the determined mode of communication may be a written communication (e.g., a friendly-reminder or check-in via one of an email, instant message, or application notification to the actor). Other combinations of potential communications modalities, based on the actor's emotional state, and the priority level of the task will be recognized by those of ordinary skill in the art. For example, if actor context data indicates that the actor dislikes phone calls, and the actor is in a negative emotional state, then to preserve a relationship with the actor, a requestor may not call them (depending on a priority level of the task assigned to the actor).

Flow progresses to operation 610, wherein the communication to the actor is generated with the determined style.

The determined style may be a tone in which the communication is drafted (e.g., urgent, formal, informal, lax, etc.). Additionally, or alternatively, the style may be a person-specific style of how a specific requestor typically drafts communications. For example, if a requestor tends to use the same greetings, or closing phrases, then those same tendencies may be incorporated into the generated communication. In this respect, the generated communication may mimic the writing-style or speaking-style (e.g., semantics) of a requestor, when the requestor is communicating with the actor.

Further, flow progresses to operation 612, wherein the communication to the actor is sent, via the determined mode of communication. As discussed earlier herein, the modality of communication may be one of a plurality of different forms. For example, the communication may be a visual communication (e.g., one or more of an email, instant message, or application notification to the actor). Additionally, or alternatively, the communication may be an audio communication (e.g., one or more of a phone call, or audio file sent to the actor).

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein.

Figure 7:
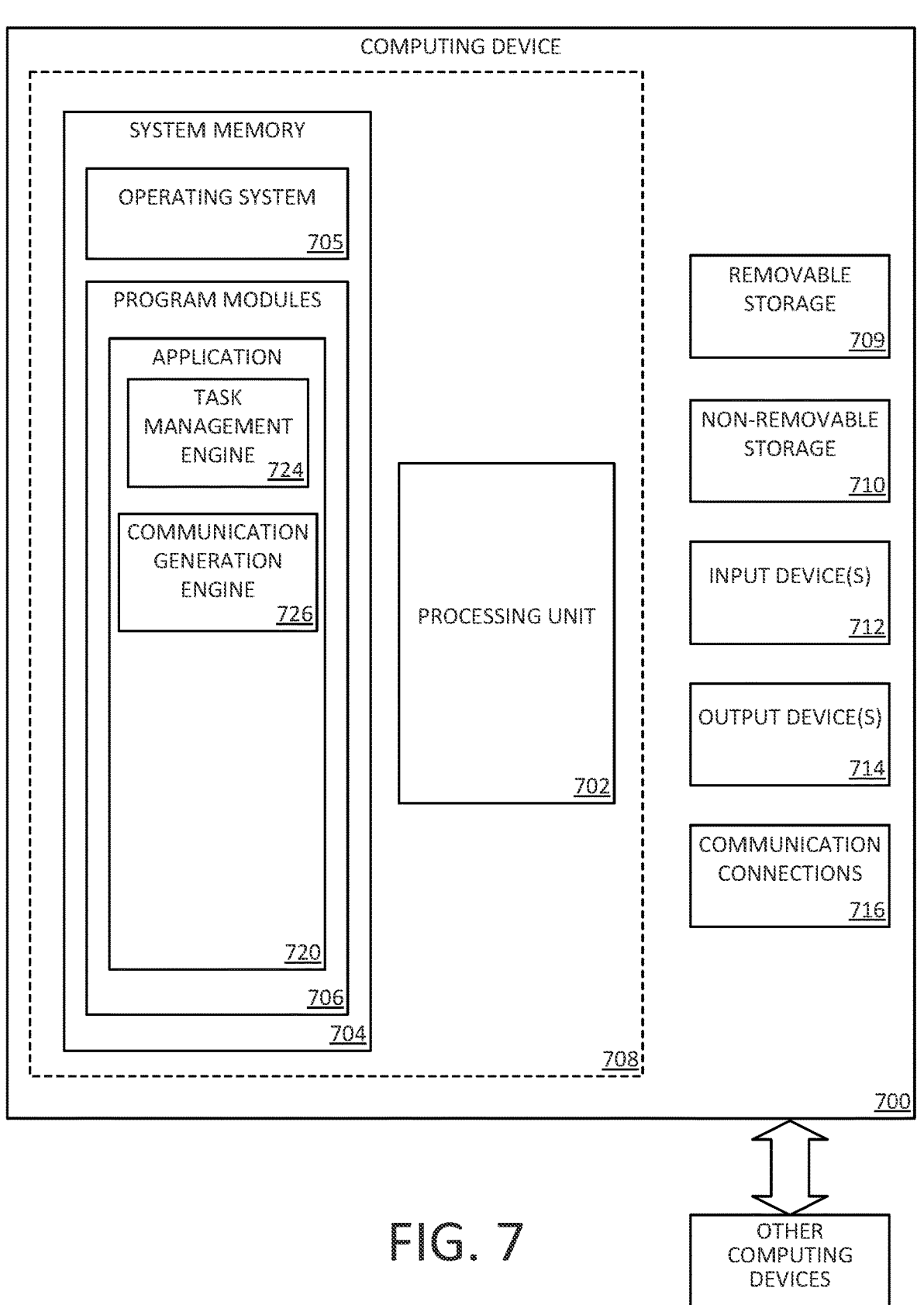
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above, including computing device 102 or some examples of actor device 118 in FIG. 1. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for running software application 720, such as one or more components supported by the systems described herein. As examples, system memory 704 may store task management engine or component 724 and communication generation engine or component 726. The operating system 705, for example, may be suitable for controlling the operation of the computing device 700.

Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
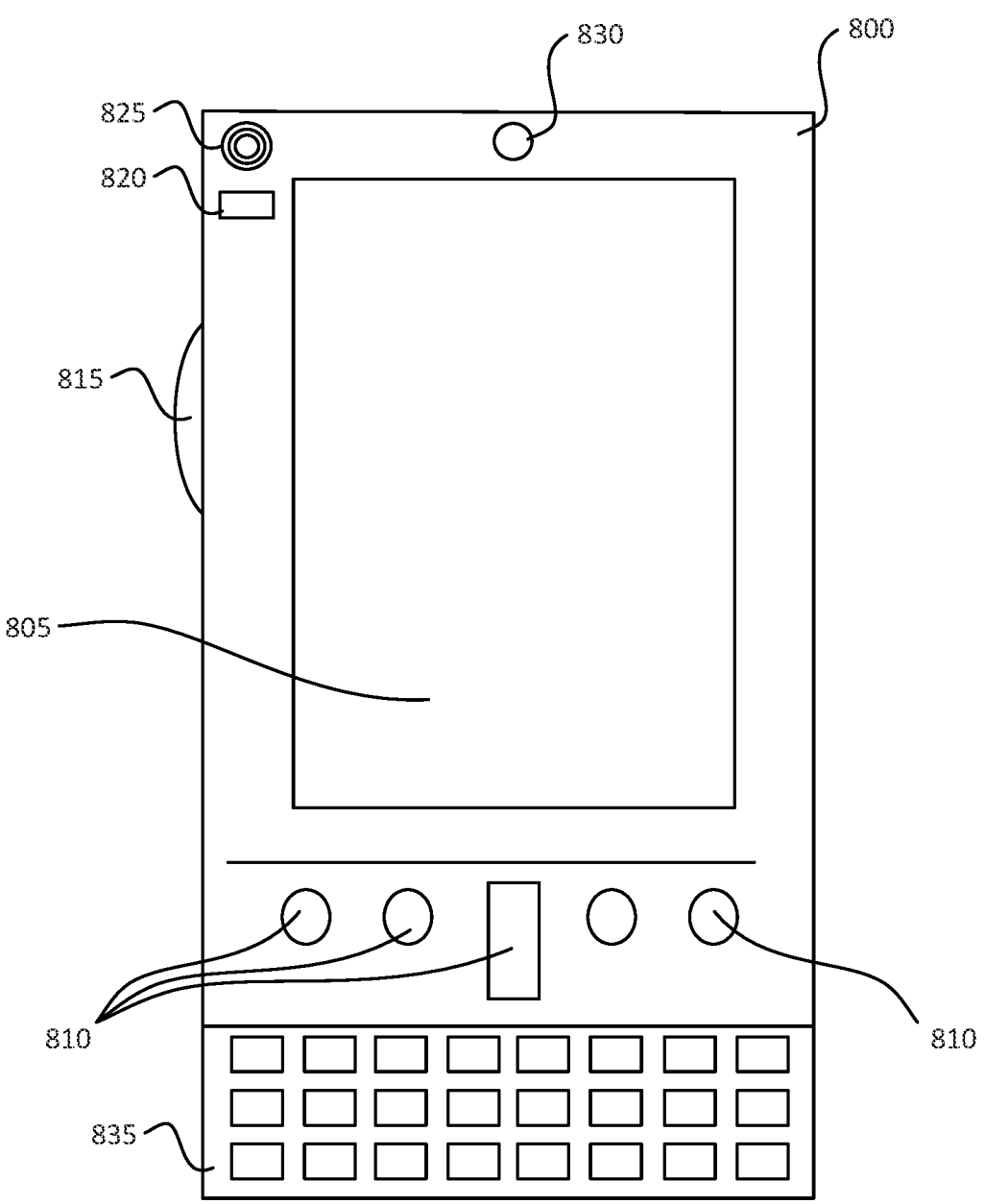
FIGS. 8A and 8B are simplified block diagrams of a mobile computing device with which aspects of the present disclosure may be practiced.
Figure 8B:
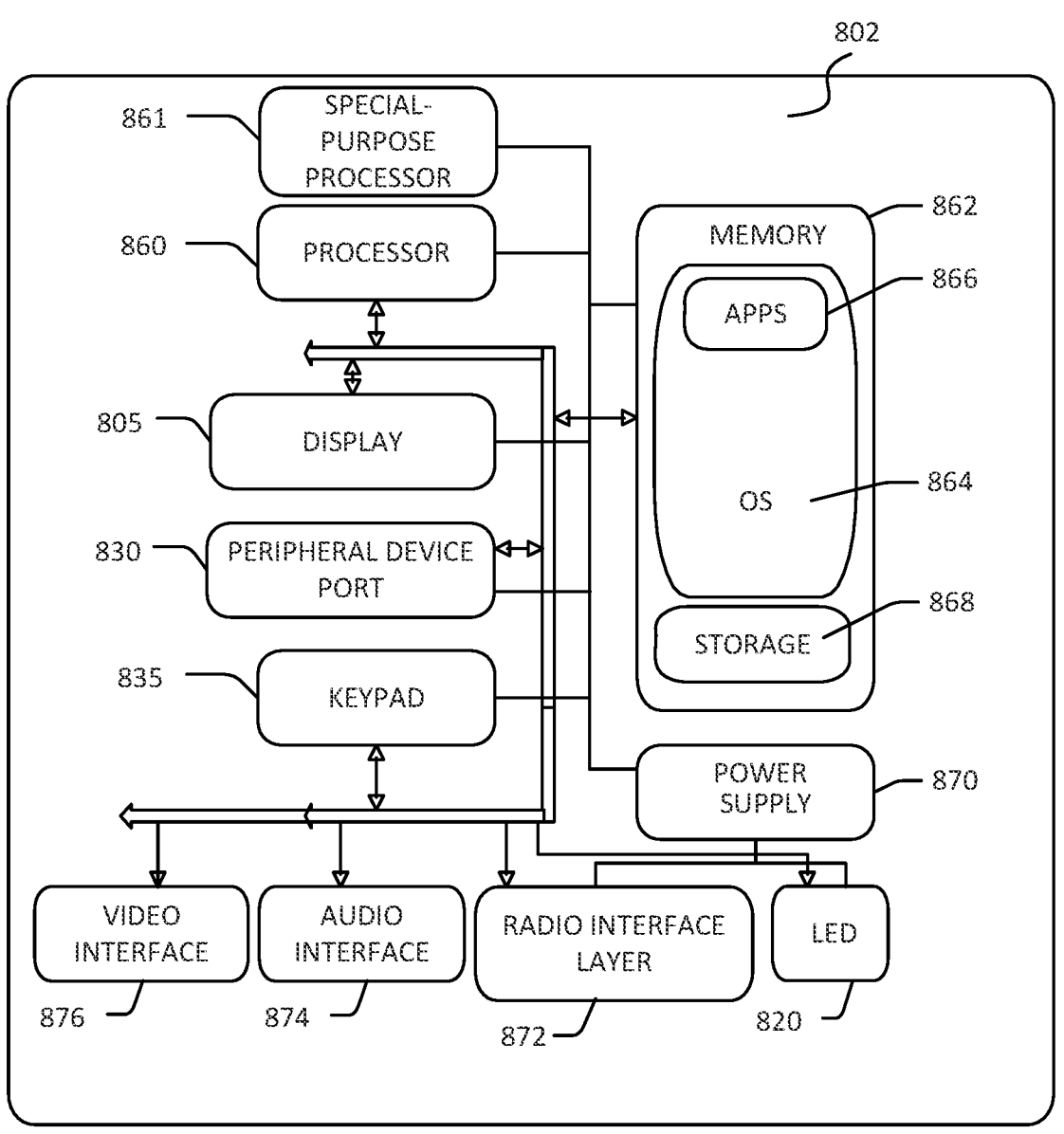

FIGS. 8A and 8B illustrate a mobile computing device 800, for example, a mobile telephone, a smart phone, wearable computer (such as a smart watch), a tablet computer, a laptop computer, and the like, with which some aspects of the disclosure may be practiced. In some aspects, the client may be a mobile computing device. With reference to FIG. 10A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display).

If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some examples.

In yet another alternative example, the mobile computing device 800 is a portable phone system, such as a cellular phone. The mobile computing device 800 may also include an optional keypad 835. Optional keypad 835 may be a physical keypad or a "soft" keypad generated on the touch screen display.

In various examples, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In some examples, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., a task management engine, communication generation engine, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and/or special-purpose processor 861 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
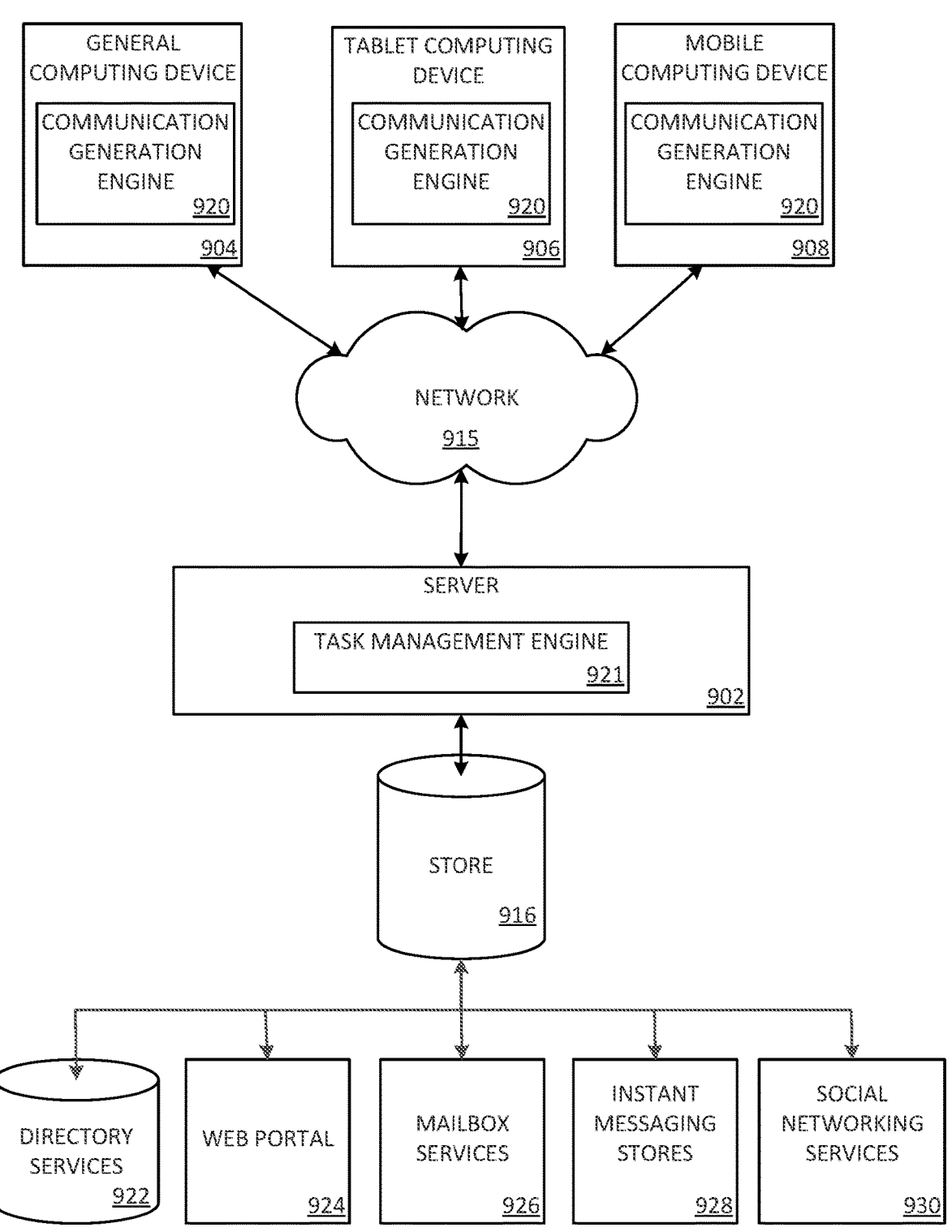
FIG. 9 is a simplified block diagram of a distributed computing system in which aspects of the present disclosure may be practiced.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930.

A communication generation engine or component 920 may be employed by a client that communicates with server device 902, and/or task management engine or component 921 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these examples of the computing devices may obtain content from the store 916, in addition to receiving graphical data useable to be either pre-processed at a graphic-originating system, or post-processed at a receiving computing system.

Figure 10:
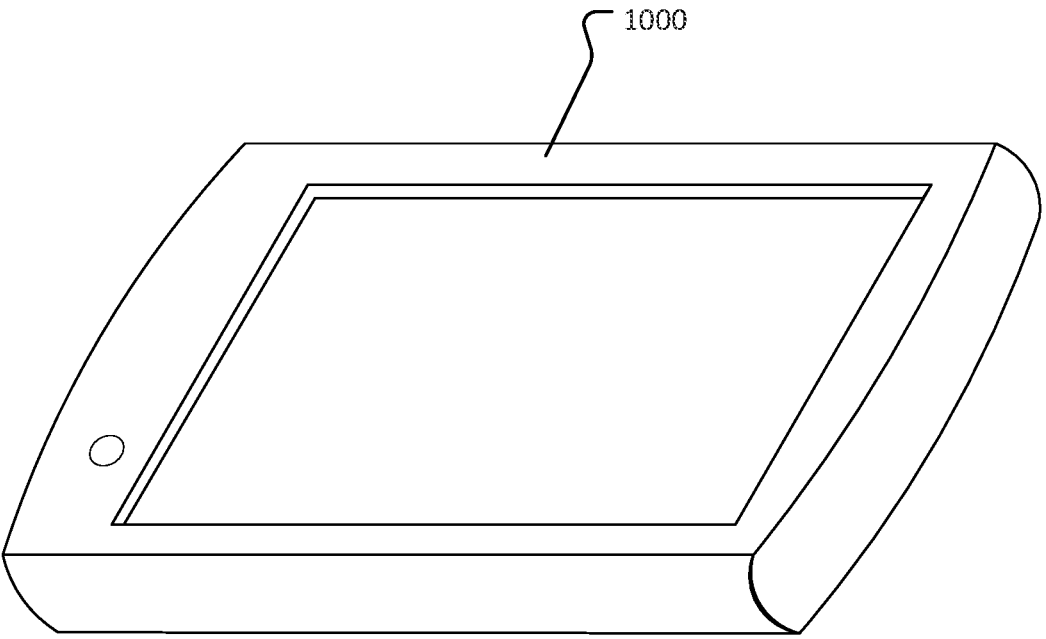
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for assisting a requestor to manage activities across a plurality of actors, the system comprising:
   at least one processor; and
   memory storing instructions that, when executed by the at least one processor, causes the system to perform a set of operations, the set of operations including:
   receiving, from a computing device of a requestor, a request for a task to be completed;
   receiving actor context data;
   recording an assignment of the task to an actor, the assignment being based on the actor context data;
   generating, using a machine learning model, message content for the task to request completion of the assigned task by the actor, wherein the machine learning model has previously been trained to generate communication based on a training message content and a training task acceptance and completion;
   sending, to a computing device of the actor, a communication comprising the generated message content;
   receiving, from the computing device of the actor, a feedback indication corresponding to the message content; and
   updating, based on modified message content of the generated message content according to the feedback indication, the machine learning model as reinforcement learning, thereby increasing a probability that future message content generated for the actor to assign a given task by the machine learning model trained based on the modified message content results in acceptance, by the actor, of the given task.

2. The system of claim 1, wherein the set of operations further comprises:
   determining whether the actor context data was provided with the request; and
   if the actor context data was not provided with the request, obtaining the actor context data.

3. The system of claim 1, wherein the set of operations further comprises:
   determining if the feedback indication indicates that the actor has accepted the task; and
   if the feedback indication indicates that the actor has accepted the task, updating a task management engine.

4. The system of claim 1, wherein the set of operations further comprises:

determining whether the feedback indication indicates that the actor has accepted the task;

if the feedback indication does not indicate that the actor has accepted the task, updating the actor context data; and recording an assignment of the task to another actor, the re-assignment being based on the updated actor context data.

5. The system of claim 1, wherein the message content for the communication is generated based on at least one of: a nature of the relationship between the actor and the requestor, a working habit of the actor, availability of the actor, an emotional state of the actor, a task priority, a preferred mode of communication, the computing device of the actor, or a communication style of the requestor.

6. The system of claim 1, wherein the communication is a visual communication.

7. The system of claim 6, wherein sending the communication comprises sending one of an email, instant message, or application notification.

8. The system of claim 1, wherein the communication is an audio communication.

9. The system of claim 8, wherein sending the communication comprises calling the computing device of the actor.

10. The system of claim 1, wherein the machine learning model is trained based on different communication types.

* * * * *